US012451594B2

(12) United States Patent
Staita et al.

(10) Patent No.: US 12,451,594 B2
(45) Date of Patent: Oct. 21, 2025

(54) ANTENNA ASSEMBLY SUPPORTING FDD AND TDD OPERATIONAL MODES AND REFLECTOR SUB-ASSEMBLY THEREOF

(71) Applicant: Telefonaktiebolaget LM Ericsson (publ), Stockholm (SE)

(72) Inventors: Christoph Staita, Oberaudorf (DE); Philipp Karl Gentner, Vienna (AT); Magnus Hubner, Hohenlinden (DE); Thomas Ettstaller, Bruckmühl (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 147 days.

(21) Appl. No.: 18/271,086

(22) PCT Filed: Jan. 13, 2021

(86) PCT No.: PCT/EP2021/050564

§ 371 (c)(1),
(2) Date: Jul. 6, 2023

(87) PCT Pub. No.: WO2022/152372

PCT Pub. Date: Jul. 21, 2022

(65) Prior Publication Data

US 2024/0072421 A1 Feb. 29, 2024

(51) Int. Cl.

*H01Q 15/14* (2006.01)
*H01Q 1/24* (2006.01)
*H01Q 21/06* (2006.01)
*H01Q 1/42* (2006.01)
*H01Q 5/42* (2015.01)
*H01Q 5/48* (2015.01)

(52) U.S. Cl.

CPC ............ *H01Q 1/246* (2013.01); *H01Q 15/14* (2013.01); *H01Q 21/062* (2013.01); *H01Q 1/42* (2013.01); *H01Q 5/42* (2015.01); *H01Q 5/48* (2015.01)

(58) Field of Classification Search

CPC ................................ H01Q 1/24; H01Q 1/246; H01Q 1/42; H01Q 15/14; H01Q 19/10; H01Q 19/108;

(Continued)

(56) References Cited

U.S. PATENT DOCUMENTS 7,577,398 B2 8/2009 Judd et al.
7,679,576 B2 * 3/2010 Riedel ................. H01Q 19/108 343/810

(Continued)

FOREIGN PATENT DOCUMENTS

CN 111555013 A 8/2020
EP 2784876 B1 5/2020
WO 9959223 A2 11/1999

OTHER PUBLICATIONS

Request for the Submission of an Opinion for Korean Patent Application No. 10-2023-7023904, mailed Dec. 16, 2024, 15 pages.

(Continued)

*Primary Examiner* — Tho G Phan

(74) *Attorney, Agent, or Firm* — Withrow & Terranova, PLLC

(57) ABSTRACT

A reflector sub-assembly for an antenna assembly configured to support FDD and TDD modes of operation is presented. The reflector sub-assembly comprises a reflector defining at least one reflector opening, and at least one first PCB arranged to cover the reflector opening having a first PCB side directed towards the reflector and with a metallic layer thereon and a second PCB side directed away from the reflector and comprising one or more first electric lines. The reflector sub-assembly also comprises an array of first radiators to support a TDD mode extending through the reflector opening and having a feeding end directed towards the first PCB and electrically connected to at least one of the first electric lines and a distant end facing away from the first PCB and carrying at least one first radiating element. The (Continued)

reflector sub-assembly further comprises one or more second radiators to support an FDD mode.

28 Claims, 9 Drawing Sheets

(58) Field of Classification Search
CPC .... H01Q 21/00; H01Q 21/0006; H01Q 21/06; H01Q 21/062; H01Q 21/24; H01Q 5/42; H01Q 5/48
See application file for complete search history.

(56) References Cited

U.S. PATENT DOCUMENTS

| | | | | |
|---|---|---|---|---|
| 8,350,775 | B2 * | 1/2013 | Obermaier | H01Q 21/26 343/834 |
| 9,000,991 | B2 * | 4/2015 | Ramberg | H01Q 13/085 343/793 |
| 10,790,576 | B2 | 9/2020 | Buondelmonte | |
| 12,088,017 | B2 * | 9/2024 | Wu | H01Q 1/24 |
| 12,148,986 | B2 * | 11/2024 | Wu | H01Q 19/22 |
| 12,199,345 | B2 * | 1/2025 | Sun | H01Q 5/48 |
| 2004/0110469 | A1 | 6/2004 | Judd et al. | |
| 2010/0182213 | A1 | 7/2010 | Obermaier et al. | |
| 2016/0248167 | A1 | 8/2016 | Iso et al. | |
| 2017/0040679 | A1 | 2/2017 | Frohler et al. | |
| 2017/0222313 | A1 | 8/2017 | Markof et al. | |

OTHER PUBLICATIONS

International Search Report and Written Opinion for International Patent Application No. PCT/EP2021/050564, mailed Oct. 5, 2021, 14 pages.

Examination Report for European Patent Application No. 21700560.2, mailed Aug. 22, 2025, 9 pages.

* cited by examiner

ANTENNA ASSEMBLY SUPPORTING FDD AND TDD OPERATIONAL MODES AND REFLECTOR SUB-ASSEMBLY THEREOF

This application is a 35 U.S.C. § 371 national phase filing of International Application No. PCT/EP2021/050564, filed Jan. 13, 2021, the disclosure of which is incorporated herein by reference in its entirety.

TECHNICAL FIELD

The present disclosure generally relates to wireless communication. In more detail, the present disclosure concerns a reflector sub-assembly for an antenna assembly configured to support Frequency Division Duplex (FDD) and Time Division Duplex (TDD) modes of operation in a wireless communication network. The present disclosure also provides an antenna assembly comprising the reflector sub-assembly.

BACKGROUND

In most parts of the world, previous and current generations of mobile communication networks are based on FDD operation, meaning that there is one channel for the downlink direction from the base station to the terminal device and a separate channel for the uplink direction. Nonetheless, in China and other countries there have been significant spectrum allocations for TDD operation, which uses a single channel intermittently for transmissions in the downlink direction and in the uplink direction. While, therefore, $4^{th}$ Generation (4G) networks for example started mostly as FDD networks, 4G networks have also been deployed in a TDD variant in countries like China.

Depending on the duplexing mode to be supported, a base station is equipped either with an antenna assembly specifically configured for FDD operation or an antenna assembly specifically configured for TDD operation (or with both types of antenna assemblies). It is to be noted that antenna assemblies configured for FDD operation generally have stricter requirements than antenna assemblies configured for TDD operation, for example because passive intermodulation (PIM) is more problematic for FDD operation when adjacent transmit and receive bands are used simultaneously. As such, proper electromagnetic shielding is of high importance for antenna assemblies that support FDD operation. On the other hand, antenna assemblies that support TDD operation are generally not particularly optimized to minimize PIM, mainly for cost reasons.

The $5^{th}$ Generation (5G) networks that are currently being deployed rely on FDD operation as well as TDD operation. As a consequence, base stations for such networks likewise have to support both duplexing modes, by co-locating an antenna assembly for FDD with an antenna assembly for TDD at the same site.

A full integration of FDD antenna components and TDD antenna components into a single antenna assembly would often be desirable for achieving a compact antenna design and for ease of installation at the base station site. In this regard, it would also be desirable to re-use existing TDD components, but those TDD components have not specifically been optimized in regard to FDD-specific issues such as PIM. From a more general perspective, it has been found that compact size and efficient electromagnetic shielding are controversial design goals for an antenna assembly that is configured to support both FDD and TDD modes of operation.

SUMMARY

As a consequence, there is a need for a solution that permits a co-existence of FDD antenna components and TDD antenna components in a compact antenna assembly.

According to a first aspect, a reflector sub-assembly for an antenna assembly configured to support FDD and TDD modes of operation is presented. The reflector sub-assembly comprises a reflector defining at least one reflector opening. The reflector sub-assembly further comprises at least one first printed circuit board (PCB) arranged to cover the at least one reflector opening so as to prevent electromagnetic radiation from passing through the at least one reflector opening. The first PCB has a first PCB side directed towards the reflector and having a metallic layer thereon, and a second PCB side directed away from the reflector and comprising one or more first electric lines. The reflector sub-assembly also comprises an array of first radiators to support a TDD mode. The first radiators extend through the at least one reflector opening in the reflector and have a feeding end directed towards the at least one first PCB and electrically connected to at least one of the one or more first electric lines, and a distant end facing away from the at least one first PCB and carrying at least one first radiating element. The reflector sub-assembly further comprises one or more second radiators to support an FDD mode, wherein the one or more second radiators have a feeding end positioned, in a planar projection, within the array of first radiators, and a distant end facing away from the reflector and carrying at least one second radiating element.

The reflector sub-assembly may comprise one or more second electric lines feeding the one or more second radiators. Those one or more second electric lines may extend, in a planar projection, from within the array of first radiators to outside the array of first radiators.

The reflector sub-assembly may comprise at least one mounting element for the at least one second radiator. The mounting element may be mounted to the reflector. In some variants, the mounting element extends, in a planar projection, from within the array of first radiators to outside the array of first radiators.

The at least one mounting element may carry the one or more second electric lines feeding the one or more second radiators. The at least one mounting element may comprise or consist of a second PCB on which the one or more second electric lines are provided. In some implementations, the second PCB has a first PCB side directed towards the reflector and having a metallic layer thereon, and a second PCB side directed away from the reflector and comprising the one or more second electric lines.

The metallic layer of the first PCB side of the second PCB may be capacitively coupled to the reflector via a dielectric therebetween. In a similar manner, the metallic layer of the first PCB side of the at least one first PCB may be capacitively coupled to the reflector via a dielectric therebetween.

In one variant, the at least one first PCB and the second PCB are located on different sides of the reflector. In another variant, the at least one first PCB and the second PCB are located on the same side of the reflector.

Multiple second radiators may be provided. In such a case, the mounting elements may comprise a dedicated mounting element for each of the multiple second radiators.

The array of first radiators may comprise at least one of (i) one or more rows and (ii) one or more columns. The at least one mounting element may, in a planar projection, extend between two adjacent rows or two adjacent columns.

The reflector may define multiple reflector openings. As an example, the reflector may define a dedicated reflector opening for a dedicated one of the first radiators. The at least one first PCB may cover at least two of the multiple reflector openings. The at least one first PCB may consist of a single PCB that covers each dedicated reflector opening.

A circumferential shape of the reflector opening may correspond to, and be slightly larger than, a circumferential shape of one of the first radiators in the vicinity of its respective feeding end. In this case, the feeding end can snugly be moved through the dedicated reflector opening upon manufacturing of the sub-assembly.

The reflector may comprise a substantially planar reflector surface in which the at least one reflector opening is defined. The reflector may be made from sheet metal.

According to a second aspect, an antenna assembly is provided that comprises the reflector sub-assembly as presented herein and a housing sub-assembly coupled to the reflector sub-assembly to define an enclosed space accommodating at least the at least one first PCB.

The housing sub-assembly may be configured to prevent electromagnetic radiation from leaving or entering the enclosed space in any region not shielded by the reflector sub-assembly.

The antenna assembly may comprise active electronic components electrically connected to the at least one first PCB. The housing sub-assembly, in turn, may comprise a cooling housing thermally coupled to the active electronic components and having one or more geometric cooling structures in a region outside the enclosed space.

The antenna assembly may comprise a shielding frame arranged between the reflector and the cooling housing. In some variants, the shielding frame is made from sheet metal. The shielding frame my be capacitively coupled to at least one of the cooling housing and the reflector via a dielectric therebetween. The shielding frame may be coupled to the reflector without a metallic connection element being arranged therebetween.

Also provided is a base station for a mobile network system, wherein the base station comprises the antenna assembly presented herein.

BRIEF DESCRIPTION OF THE DRAWINGS

Embodiments of the disclosure presented herein are described herein below with reference to the accompanying drawings, wherein.

DETAILED DESCRIPTION

Figure 1:
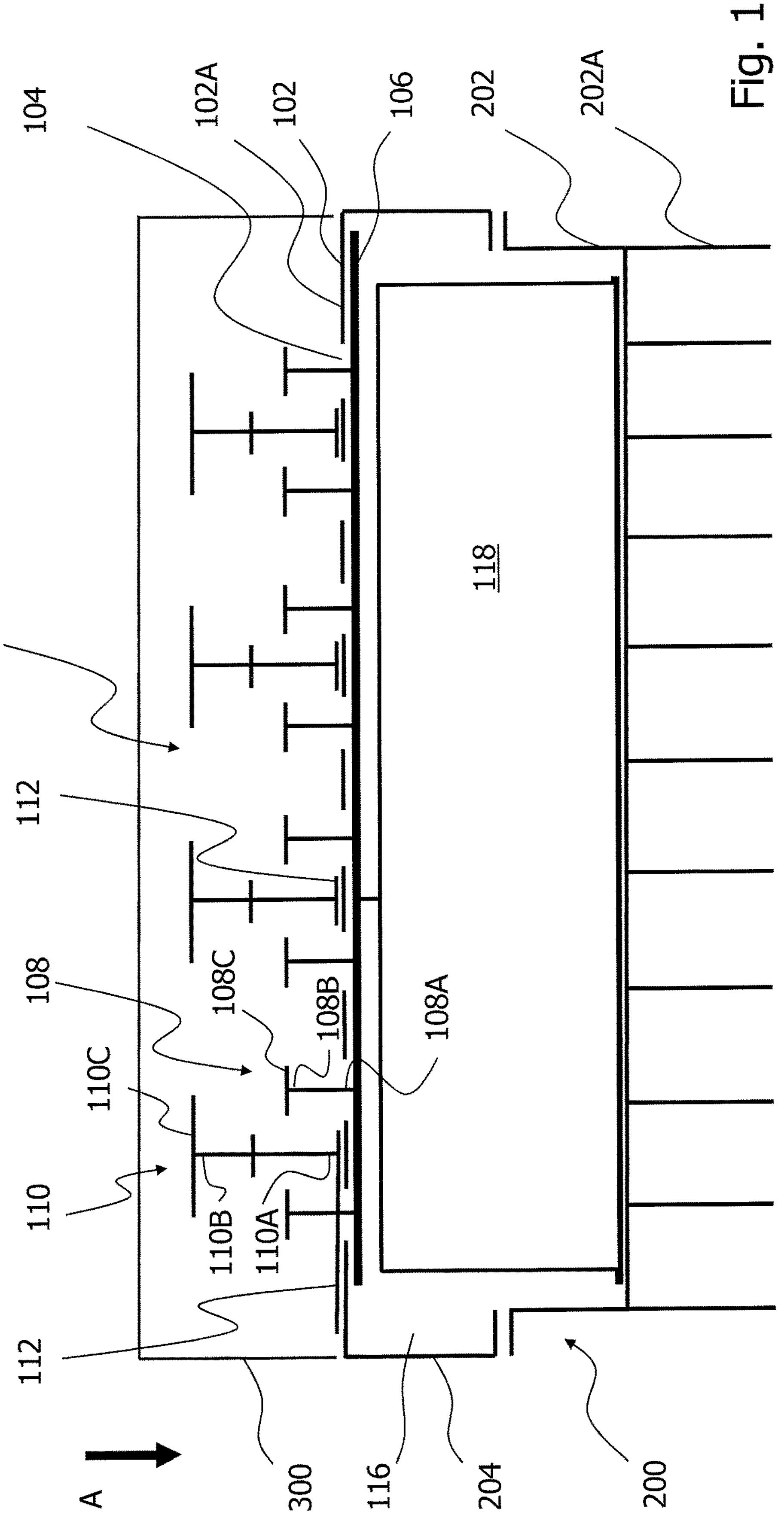
FIG. 1 shows a schematic cross-sectional view of a first embodiment of an antenna assembly configured to support TDD and FDD modes of operation.

In the following description of exemplary embodiments, for purposes of explanation and not limitation, specific details are set forth in order to provide a thorough understanding of the present disclosure. It will be apparent to one skilled in the art that the present disclosure may be practiced in other embodiments that depart from these specific details. For example, while the following embodiments will be described with reference to certain radiator configurations, it is to be noted that those radiator configurations are only provided for illustrative purposes.

In the following description, the same reference numerals are used to denote the same or similar structures.

FIG. 1 shows a cross-sectional view of a first embodiment of an antenna assembly 10 configured to support TDD and FDD modes of operation in a wireless communication network. The antenna assembly 10 can be comprised by a base station of a mobile network system (e.g., of a 4G or 5G type).

The antenna assembly 10 illustrated in FIG. 1 comprises a reflector sub-assembly 100, a housing sub-assembly 200 and a radome 300.

The reflector sub-assembly 100 comprises a reflector 102 for electromagnetic radiation to be emitted by the antenna assembly. The reflector 102 is made from a metallic material (e.g., sheet metal) and comprises a substantially planar reflector surface 102A directed away from the housing sub-assembly 200. In other embodiments, the reflector 102 may have multiple planar reflector surfaces 102A that are spaced apart from each other. A plurality of reflector openings 104 is defined in the reflector surface 102A.

The reflector sub-assembly 100 comprises at least one printed circuit board (PCB) 106 arranged to cover the reflector openings 104 so as to prevent electromagnetic radiation from passing through the reflector openings 104. As such, the at least one PCB 106 electromagnetically closes the reflector openings 104.

While in the embodiment of FIG. 1 a single PCB 106 is shown to electro-magnetically close all the reflector openings 104, it will be appreciated that two or more separate PCBs 106 could be provided to this end so as to close different reflector openings 104 by different PCBs 106. As such, a dedicated PCB 106 may be provided for each of dedicated a sub-set of one or more reflector openings 104 out of a total set of reflector openings 104.

The reflector sub-assembly 100 also comprises an array of first radiators 108 that can be fed to support a TDD operational mode. The first radiators 108 may be mutually similar or identical. In the present embodiment, the first radiators 108 are configured to operate at a dedicated frequency or in a dedicated frequency band.

Each of the first radiators 108 extends through a dedicated reflector opening 104 in the reflector 102. A particular first radiator 108 has a feeding end 108A directed towards the at least one PCB 106 and electrically connected with one or more electric feeding lines (not shown in FIG. 1) on the PCB 106. The feeding end 108A is located on one side of the reflector 102. Moreover, a particular first radiator further comprises a distant end 108B facing away from the PCB 106 and located on the other side of the reflector 102. The feeding end 108B carries one or more radiating elements 108C. In the present embodiment, the one or more radiating elements 108C are configured as dipoles.

As said, the first radiators 108 form an array. In this array, the first radiators 108 may be arranged in a regular or non-regular manner. In case the first radiators 108 are arranged in a regular manner, they may define one or more rows, optionally in the form of one or more (in particular concentric) rings, or so as to define multiple columns. The cross-sectional view of FIG. 1 illustrates a single row of first radiators 108, but it will be appreciated that one or more further rows, or different arrangements, of first radiators 108 may be present.

The reflector sub-assembly 100 further comprises a plurality of second radiators 110 that can be fed to support an FDD operational mode. The second radiators 110 may be mutually similar or identical, and they may be structurally different from the mutually similar or identical first radiators 108.

In the present embodiment, the second radiators 110 are configured to operate at a dedicated frequency or in a dedicated frequency band that is different from the dedicated frequency or dedicated frequency band associated with the first radiators 108. In some variants, the first radiators 108 may jointly be fed by a first feeding signal and the second radiators 110 may jointly be fed by a second feeding signal different from the first feeding signal.

At least some of the second radiators 110 are each mounted on a dedicated mounting element that, in the present embodiment, takes the form of a PCB 112. The PCB 112, in turn, may be mounted to the reflector 102. The PCBs 112 may each have a bar- or strip-like configuration to extend between adjacent first radiators 108. In the embodiment of FIG. 1, the (at least one) PCB 106 feeding the first radiators 108 and the PCBs 112 feeding the second radiators 110 are located on different sides of the reflector 102.

Each of the second radiators 110 has a feeding end 110A configured to be coupled to one or more feedings lines (as provided, e.g., on the associated PCB 112) and a distant end 110B. The distant end 110B faces away from the reflector 102 and carries one or more radiating elements 110C. In the present embodiment, the feeding end 110A and the distant end 110B are both located on the same side of the reflector 102. The one or more radiating elements 110C may be configured as dipoles.

As becomes apparent from FIG. 1, the respective feeding end 110A of the second radiators 110 is positioned, in a planar projection (see arrow A), within the array of first radiators 108. This means that (generally one or more, or all of) the second radiators 110 are “interleaved” with (at least some, or all of) the first radiators 108 so as to define a compact radiator arrangement. If, for example, a circumferential envelope is assumed to be defined by the outermost first radiators 108 of the array (e.g., by their respective feeding end 108A), the feeding ends 110A of one or more, or all, of the second radiators 110 will be located within this envelope when seen in a planar projection. The PCB 112 with its one or more electric feeding lines (not shown) likewise extends from within the array of first radiators 108 to outside the array of first radiators 108.

In the scenario of FIG. 1, and as indicated by arrow A, the planar projection is taken in a direction perpendicular to the planar reflector 102. In case of a non-planar configuration (e.g., in case the reflector 102 is bent in a region of the first radiators 108), a planar projection can still be defined locally.

The cross-sectional view of FIG. 1 illustrates the first radiators 108 to be arranged in a row and interleaved with the second radiators 110 such that each second radiator 110 is arranged, in the planar projection, between two first radiators 108. It will be appreciated that the first radiators 108 could be arranged in multiple, for example mutually parallel rows (e.g., so as to define multiple mutually parallel columns). It will also be appreciated that one or more first radiators 108 could not belong to the array spanned by other first radiators 108. In a similar manner, one or more second radiators 110 could be located, in a planar projection, outside the array of first radiators 108, as long as at least one other second radiator 110 lie within this array in a planar projection.

Figure 2:
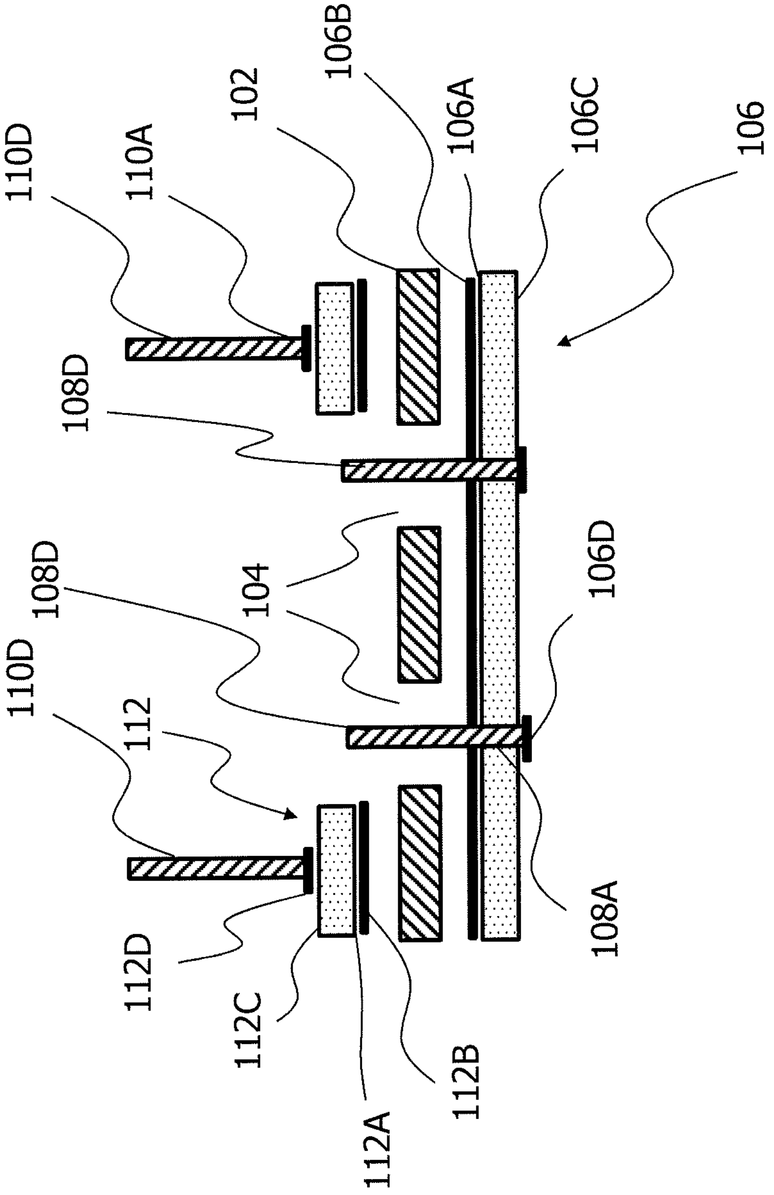
FIG. 2 shows an enlarged cross-sectional view of a portion of the antenna assembly of FIG. 1.

The reflector sub-assembly 100 of FIG. 1 will now be described in greater detail with reference to FIG. 2. FIG. 2 illustrates an enlarged cross-sectional view of the antenna assembly of FIG. 1 in a region comprising the PCB 106 and the reflector 102 with its reflector openings 104. Two exemplary first radiators 108 and an exemplary second radiator 110 are only schematically illustrated with a portion of their respective mounting post 108D, 110D that structurally and electrically connects the respective feeding end 108A, 110C to the associated radiating elements (not shown in FIG. 2).

As illustrated in FIG. 2, the PCB 106 has a first PCB side (or face) 106A directed towards the reflector 102 and covered by a metallic layer 106B serving as a ground layer. The metallic layer 106B may substantially cover the entire first PCB side 106A or only one or more portions thereof, in particular to overlap with the reflector openings 104. The metallic layer 106B, or a portion thereof, may have a cross-sectional extension that typically is (at least somewhat) larger than the associated reflector opening 104 that is to be electromagnetically closed by the metallic layer 106B. To this end, the metallic layer 106B is capacitively coupled to the reflector 102 via a dielectric (e.g., air or any other dielectric material) therebetween. Of course, the metallic layer 106B on the PCB 106 may in some variants be a substantially continuous layer that substantially covers the entire PCB 106. In such a case, the metallic layer 106B may at least partially overlap with a certain area of each reflector opening 104 to block electromagnetic radiation from passing through the reflector openings 104.

The PCB 106 also has a second PCB side (or face) 106C directed away from the reflector 102 and comprising one or more electric feeding lines 106D electrically coupled to the feeding end 108A of each first radiator 108 (see FIG. 1). The PCB 106 may have a via hole (not shown in FIG. 2) that allows the feeding end 108A to at least partially extend through the PCB 106 towards the one or more feeding lines 106D.

As further shown in FIG. 2, the PCB 112 has a first PCB side (or face) 112A directed towards the reflector 102 and covered at least partially by a metallic layer 112B serving as a ground layer. The metallic layer 112B is capacitively coupled to the reflector 102 via a dielectric (e.g., air or any other dielectric material) therebetween. The metallic layer 112B is a substantially continuous layer. The PCB 112 also has a second PCB side (or face) 112C directed away from the reflector 102 and comprising one or more electric feeding lines 112D coupled to the feeding end 110A of a dedicated second radiator 108 (see FIG. 2).

Figure 3:
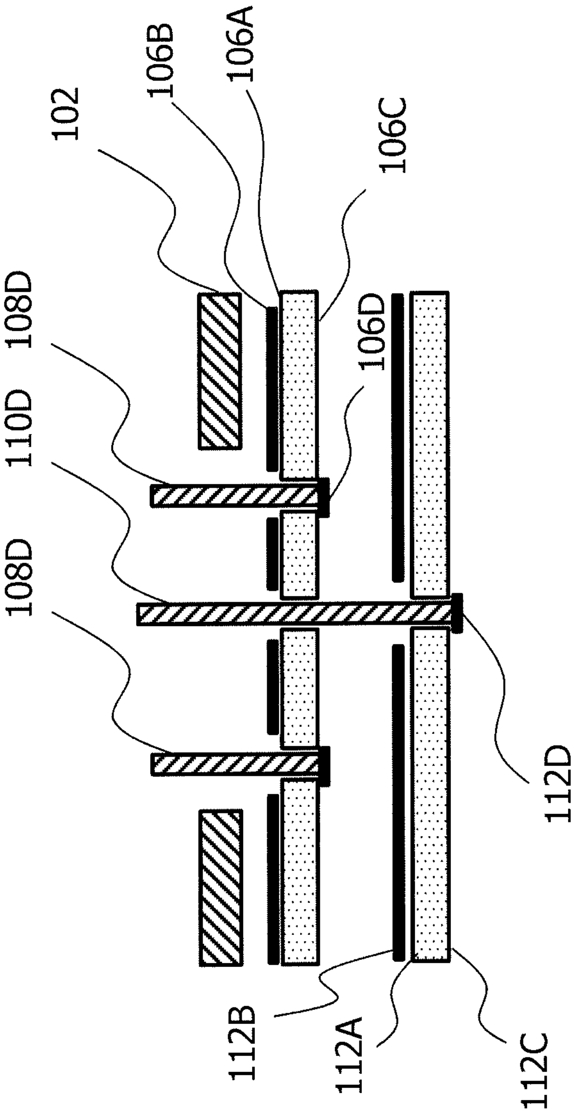
FIG. 3 shows an alternative configuration of an antenna assembly similar to the one of FIG. 1.
Figure 4:
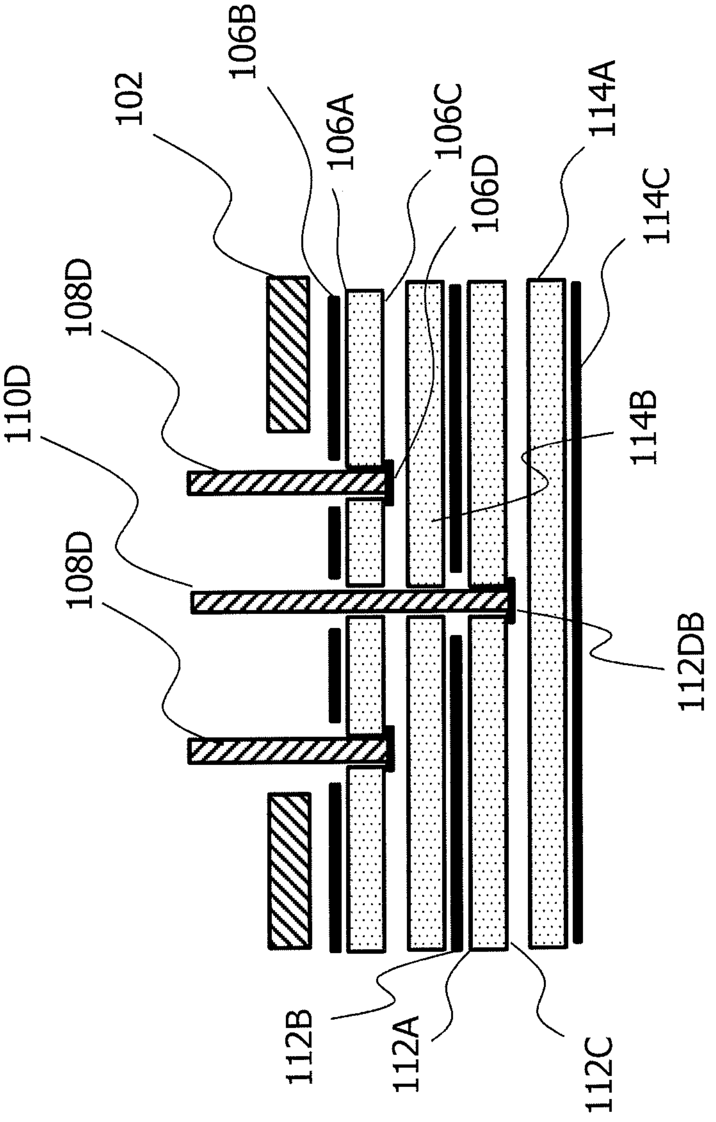
FIG. 4 shows another alternative configuration of an antenna assembly similar to the one of FIG. 1.

As illustrated in FIGS. 3 and 4, the (at least one) PCB 106 feeding the first radiators 108 and the (at least one) PCB 112 feeding the second radiators 110 may alternatively be located on the same side of the reflector 102 such that both the first radiators 108 and the second radiators 110 extend through the reflector 102. In the examples shown in FIGS.

3 and 4, the PCB 106 is located between the reflector 102 and the PCB 112, in which case the PCB 106 comprises a dedicated through opening for each second radiator 110. The metallic layer 112B of the PCB 112 is directed towards the reflector 102, while the one or more electric feeding lines 112D are directed away from the reflector 102.

Alternatively, one or more of the second radiators 110 may extend between two separate adjacent PCBs 106 (not shown). Of course, the PCB 112 could also be located between the reflector 102 and the PCB 106, in which case the PCB 112 may comprise a dedicated through opening for one or more of the first radiators 108, or may have a strip-like configuration to fit in between two adjacent first radiators 108.

As specifically illustrated in FIG. 4, one or more further PCBs 114A, 114B may be located, together with the PCBs 106, 112, on the same side of the reflector 102. In particular, a further PCB 114A with an associated metallic layer 114C may be provided such that that the PCBs 106, 112 are located between the reflector 102 and the PCB 114. Optionally, another PCB 114B (with our without metallic layer) may be located between the PCBs 106, 112. One or both of the PCBs 114A, 114B may also be provided in the layering scenario of FIG. 2.

Returning to the antenna assembly 10 illustrated in FIG. 1, the reflector sub-assembly 100 and the housing sub-assembly 200 together define an enclosed space 116 accommodating the PCB 106 and further components of the antenna assembly 10. Such further components may include one or more of signal distribution networks, filters, phase shifters and active electronic components 118 (e.g., one or more radio boards) electrically connected on or to the PCB 106 (and, optionally, the PCB 112, in particular in the scenarios illustrated in FIGS. 3 and 4, but also in the scenario of FIG. 2). The one or more radio boards comprised by the active electronic components 118 may be operable to feed the first radiators 108 in a TDD operational mode and to feed the second radiators 110 in an FDD operational mode (e.g., in accordance with a 4G or 5G mobile communication standard).

The housing sub-assembly 200 is configured to prevent electromagnetic radiation from entering or leaving the enclosed space 116 in any region, or direction, not shielded by the reflector sub-assembly 100. In particular, the resulting shielding blocks NM and other electromagnetic radiation from entering or leaving the enclosed space 116.

The housing sub-assembly 200 illustrated in FIG. 1 comprises a cooling housing 202 that is thermally coupled to the active electronic components 118 (e.g., via a thermally conductive medium such as a thermally conductive paste, a metallic heat conductor, or air). The cooling housing 202 has a plurality of cooling ribs 202A (or other geometric cooling structures) that distribute the absorbed heat into the environment outside the enclosed space 116.

The housing assembly 200 of FIG. 1 further comprises a shielding frame 204. In FIG. 1, the shielding frame 204 is shown to constitute an integral part of the reflector 102, but it could also be a dedicated part separate from the reflector 102.

The shielding frame 204 is a sheet metal part that extends substantially perpendicular to the reflecting surface 102A defined by the reflector 102 and towards the cooling housing 202. As such, the shielding frame 204 defines at least a portion of a side wall that circumferentially extends between the reflector 102 and the cooling housing 202.

The shielding frame 204 is capacitively coupled to the cooling housing 202 via a dielectric (e.g., a foil made from a dielectric medium) therebetween. In case the shielding frame 204 is made as a part separate from the reflector 102, it may also be capacitively coupled to the reflector 102 via a dielectric (e.g., a foil made from a dielectric medium) therebetween. In particular, no metallic connection elements (such as screws) may be used for connecting the shielding frame 204 to the reflector 102 and cooling housing 202 so as to prevent, or at least reduce, generation of PIM at the connection interface.

Still referring to FIG. 1, the antenna assembly 10 further comprises the radome 300 covering the reflector sub-assembly 100 on its reflecting side (i.e., where the first and second radiators 108, 110 are arranged). The radome 300 is made from an electromagnetically translucent material and has a compact size in its width and length dimensions (as measured in a plane parallel to the reflector 102) due to the interleaving of the first and second radiators 108, 102.

In the following, another embodiment of an antenna assembly 10 with a reflector sub-assembly 100, a housing sub-assembly 200 and a radome 300 will be described with reference to FIGS. 5 to 9. Since the embodiment discussed above with reference to FIGS. 1 to 4 could be regarded to illustrate a schematic cross-sectional view of the more detailed embodiment of FIGS. 5 to 9, the same reference numerals have been used, and only the particular details and differences of the latter embodiment will be explained in more depth below.

Figure 5:
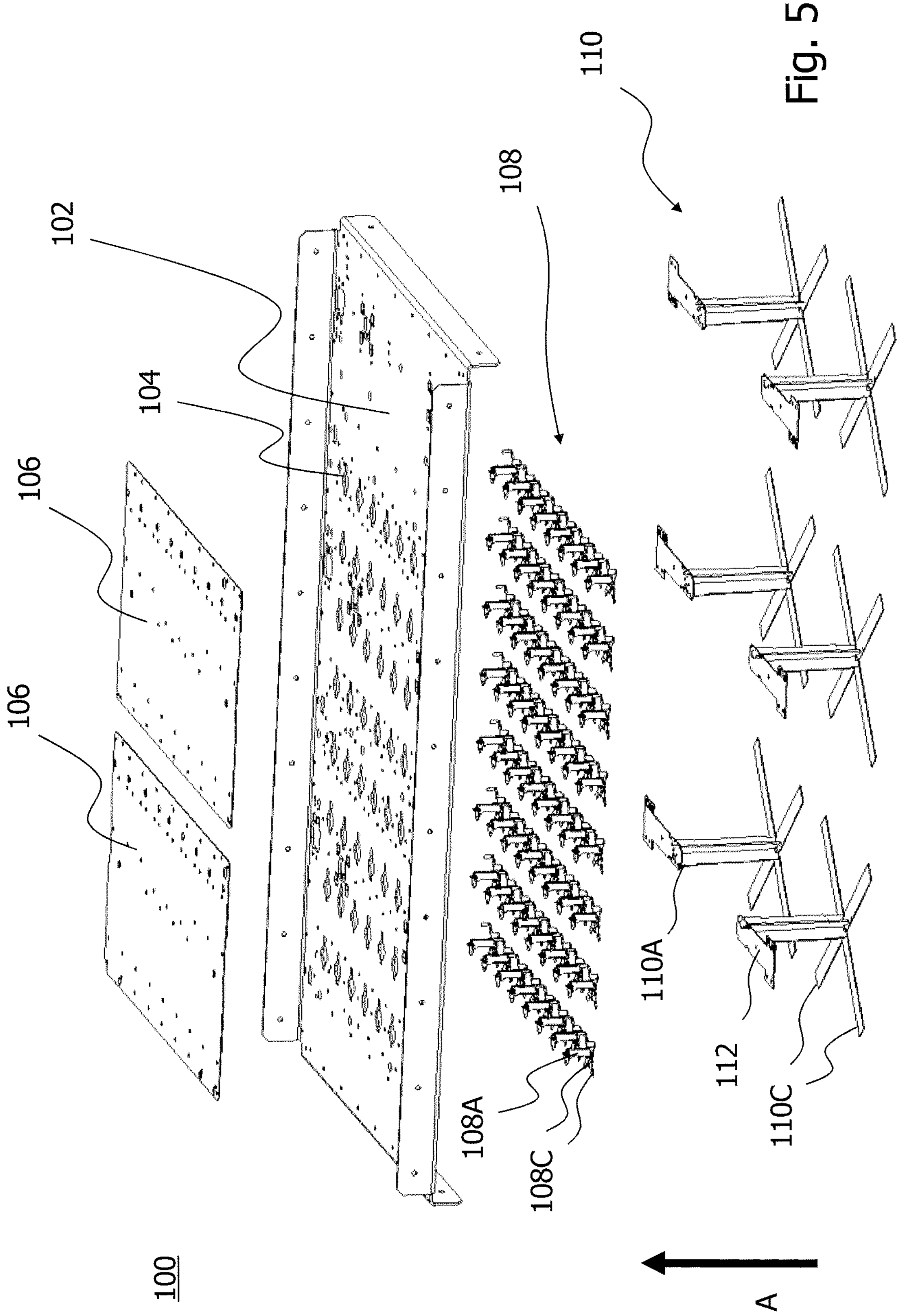
FIG. 5 shows an exploded perspective bottom view of an embodiment of a reflector sub-assembly for an antenna assembly configured to support TDD and FDD modes of operation.
Figure 6:
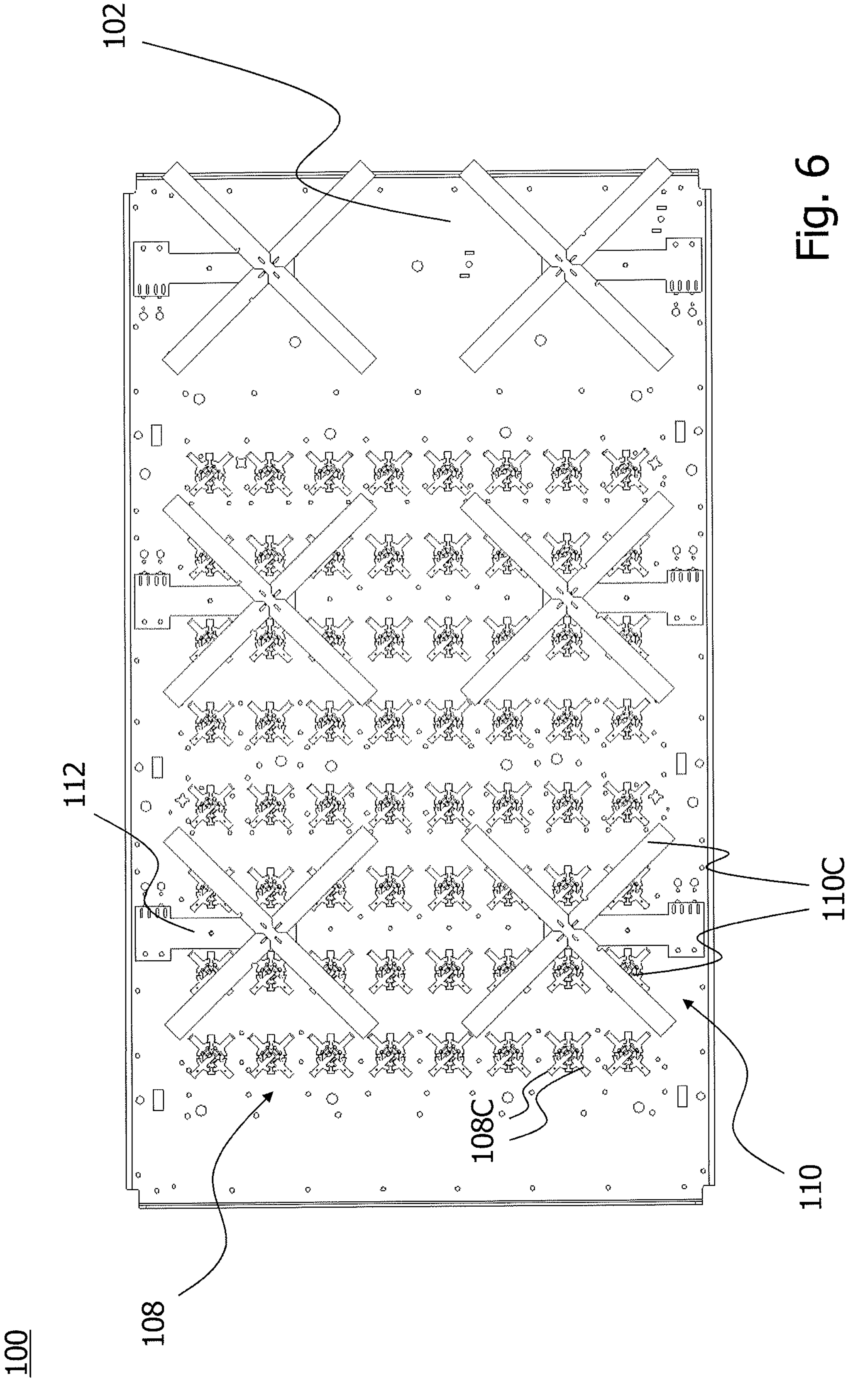
FIG. 6 shows a perspective top view of the assembled reflector sub-assembly of FIG. 5.

FIG. 5 shows an exploded perspective bottom view of the reflector sub-assembly 100, while FIG. 6 illustrates a top view thereof in an assembled state.

As becomes apparent from FIGS. 5 and 6, the reflector sub-assembly 100 comprises 64 first radiators 108 arranged in an 8×8 array comprising 8 rows and 8 columns. The reflector sub-assembly 100 further comprises 6 second radiators 108 arranged in an 2×3 array comprising 2 rows and 3 columns. Each of the first and second radiators 108, 110 carries two crossed dipoles as radiating elements 108C, 110C. The dipole ends of a particular radiator 108, 110 have the same distance to the reflector 102.

As also becomes apparent from FIGS. 5 and 6, the second radiators 110 are spatially interleaved with the first radiators 108 such that their feeding ends 110A, in a planar projection indicated by arrow A (e.g., on a plane perpendicular to the feeding ends 108A of the first radiators 108), are positioned within the array of first radiators 108. As specifically shown in FIG. 6, at least some of the dipole ends of the second radiators 110 may be located outside the array of first radiators 108 without actually affecting the dense radiator packing at the feeding ends 108A, 110A.

As shown in FIGS. 5 and 6, two PCBs 106 are provided that each feed a subset of 32 of the first radiators 108. Moreover, each of the second radiators 110 is mounted to, and fed by, a dedicated PCB 112 that extends from within the array of first radiators 108 to outside this array. Each of the PCBs 112 extends between two adjacent rows of first radiators 108 and is mounted to the reflector 102 in a region outside the array of first radiators 108.

The radiator openings 104 have a cross-like cross-section, or circumferential shape, that corresponds to (and is slightly larger than) the circumferential shape of the first radiators 108 in the vicinity of their respective feeding end 108A. Each of the first radiators 108 can thus be snugly moved through an associated reflector opening 104 during the manufacturing process to be soldered to the associated PCB 106 from the backside of the reflector 102 (see FIG. 2).

Figure 7:
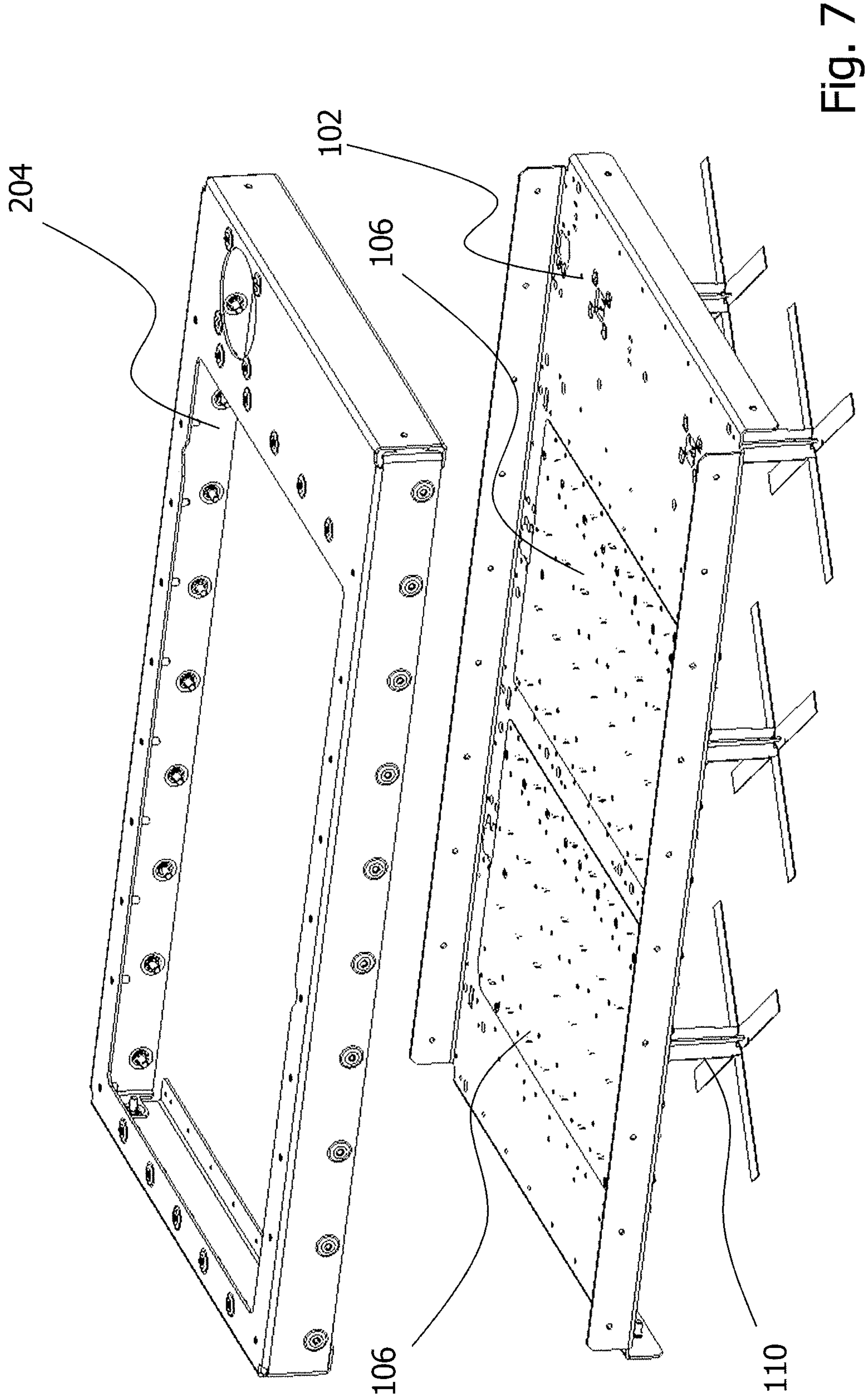
FIG. 7 shows an exploded perspective bottom view of the reflector sub-assembly of FIG. 6 and a shielding frame.

FIG. 7 shows an exploded perspective bottom view of the reflector sub-assembly 100 of FIGS. 5 and 6 and a shielding frame 204. In the present embodiment, the shielding frame 204 is a sheet metal part separate from the reflector 102. The shielding frame 204 will capacitively be coupled to the reflector 102 via a layer of dielectric material (e.g., a dielectric foil, not shown) therebetween.

Figure 8:
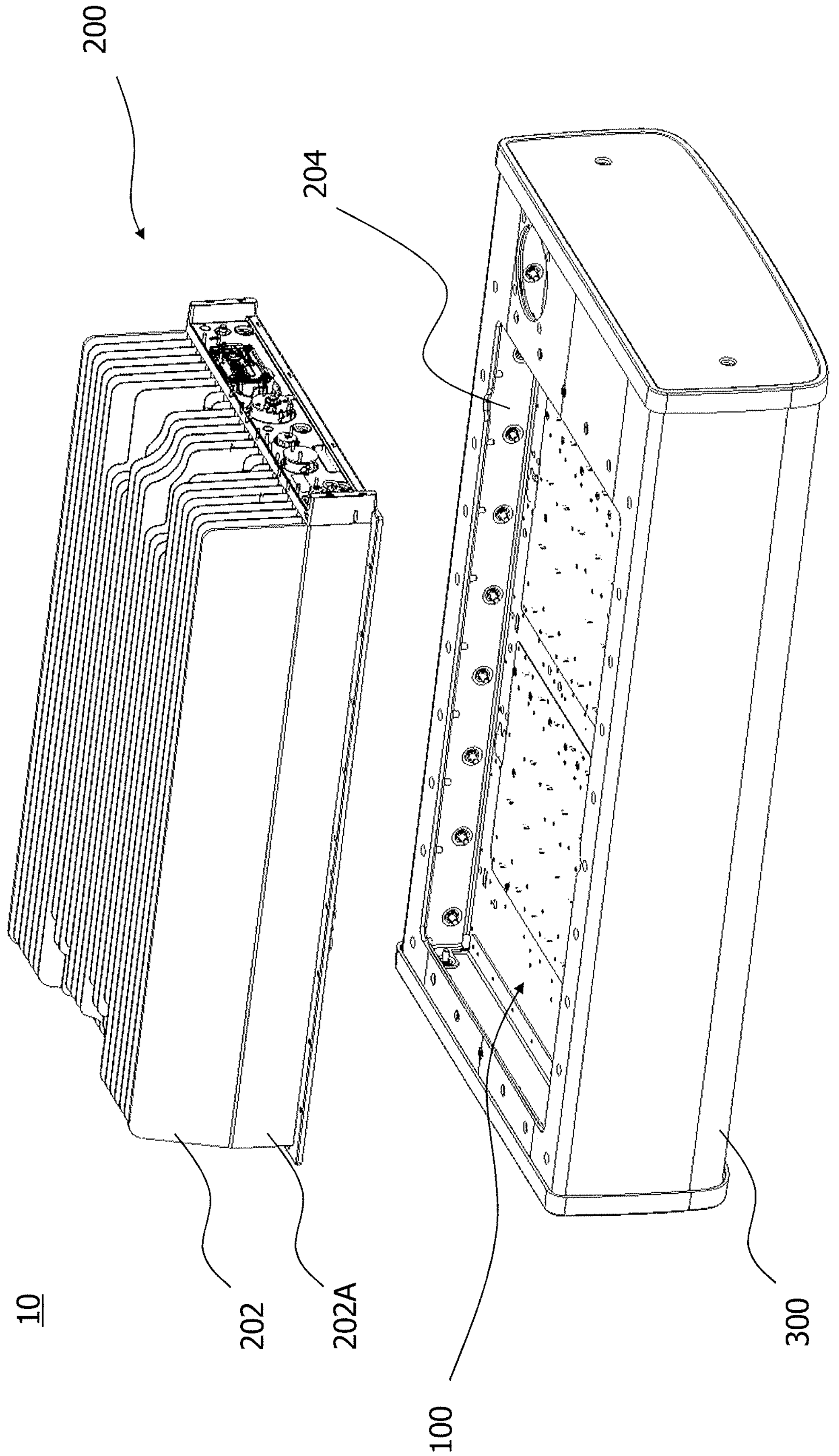
FIG. 8 shows an exploded perspective bottom view of the reflector sub-assembly and a housing sub-assembly forming a second embodiment of an antenna assembly configured to support TDD and FDD modes of operation.

FIG. 8 shows an exploded perspective bottom view of the antenna assembly 10 with the reflector sub-assembly 100 of FIGS. 5 to 7, a housing sub-assembly 200 as well as a radome 300. The housing sub-assembly 200 comprises a cooling housing 202 having a plurality of cooling ribs 202A, as explained above with reference to FIG. 1. It is to be noted that the shielding frame 204 is considered to be part of the housing sub-assembly 200 as it mainly serves electromagnetic shielding in a direction different from the reflecting direction defined by the reflector 102 in regard to radiation emitted by the first and second radiators 108, 110.

Figure 9:
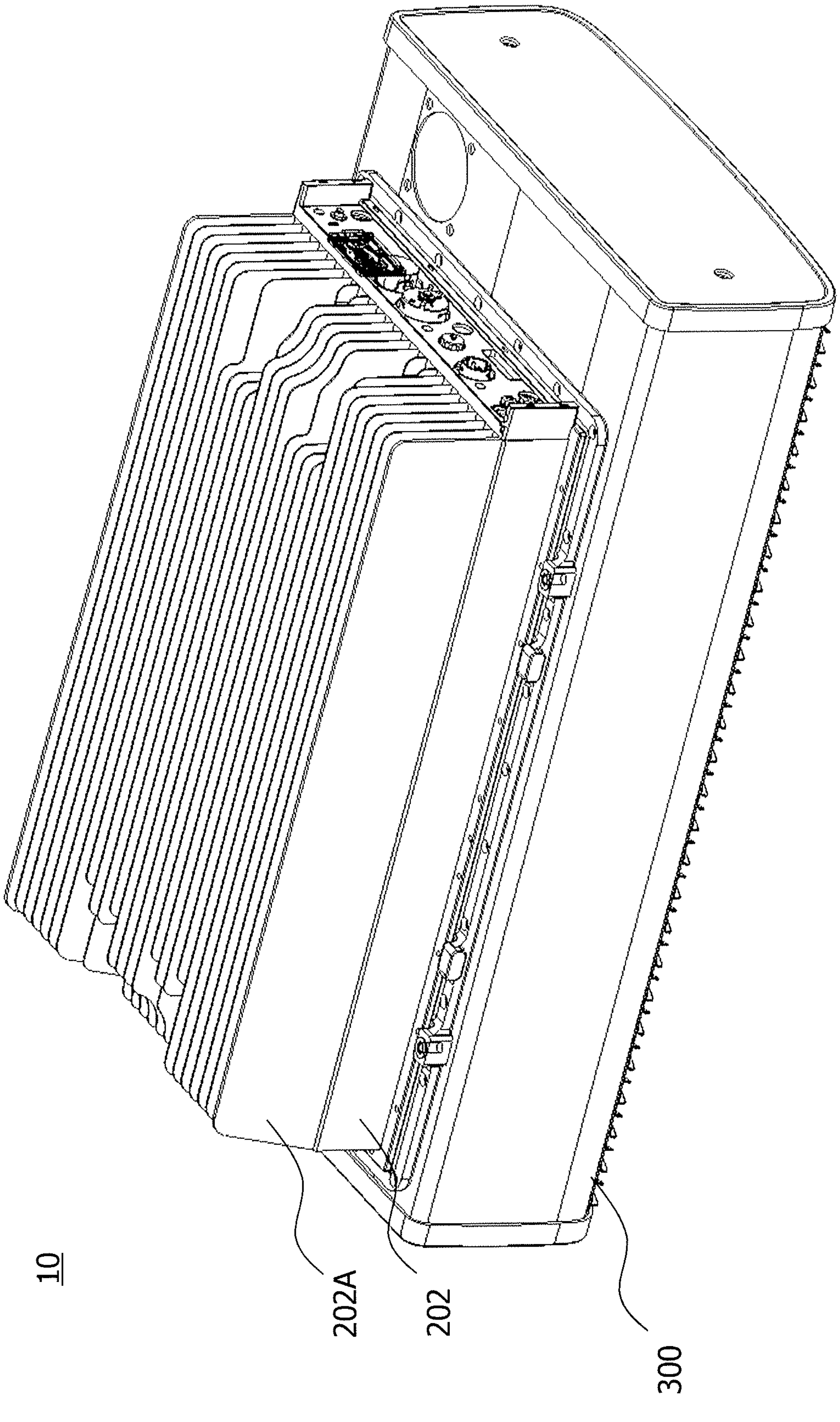
FIG. 9 shows a bottom view of the assembled antenna assembly of FIG. 8.

FIG. 9 shows the antenna assembly 10 in a fully assembled state. The resulting antenna assembly 10 may be mounted to a post at a base station site, as generally known in the art. The antenna assembly 10 is particularly suitable for massive multiple input/multiple output (MIMO) applications.

As has become apparent from the exemplary embodiments described above, the radiator packaging approach presented herein permits an integration of TDD and FDD radiators to achieve a compact antenna assembly. The compact size reduces the maximum wind load and the form factor compared to non-integrated solutions.

The packing approach may efficiently be combined with dedicated electromagnetic shielding approaches that help, for example, to tackle PIM generation. As such, existing (e.g., Advanced Antenna System, AAS) TDD antenna components not satisfying the PIM suppression requirements of FDD antenna components can be co-located therewith in a single antenna assembly. In some variants, the number of interfaces between individual housing components, and the number of components in total (including, e.g., fastening screws), can be reduced, thus also reducing the number of potential PIM sources. The resulting PIM reduction increases uplink coverage and, consequently, uplink sensitivity.

The invention claimed is:

1. A reflector sub-assembly for an antenna assembly configured to support Frequency Division Duplex, FDD, and Time Division Duplex, TDD, modes of operation, the reflector sub-assembly comprising:
- a reflector defining at least one reflector opening;
- at least one first printed circuit board, PCB, arranged to cover the at least one reflector opening so as to prevent electromagnetic radiation from passing through the at least one reflector opening, the first PCB having
  - a first PCB side directed towards the reflector and having a metallic layer thereon, and
  - a second PCB side directed away from the reflector and comprising one or more first electric lines;
- an array of first radiators to support a TDD mode, the first radiators extending through the at least one reflector opening in the reflector and having
  - a feeding end directed towards the at least one first PCB and electrically connected to at least one of the one or more first electric lines; and
  - a distant end facing away from the at least one first PCB and carrying at least one first radiating element; and
- one or more second radiators to support an FDD mode, the one or more second radiators having
  - a feeding end positioned, in a planar projection, within the array of first radiators; and
  - a distant end facing away from the reflector and carrying at least one second radiating element.

2. The reflector sub-assembly of claim 1, comprising: one or more second electric lines feeding the one or more second radiators and extending, in a planar projection, from within the array of first radiators to outside the array of first radiators.

3. The reflector sub-assembly of claim 2, wherein the at least one mounting element carries the one or more second electric lines.

4. The reflector sub-assembly of claim 3, wherein the at least one mounting element comprises or consists of a second PCB on which the one or more second electric lines are provided.

5. The reflector sub-assembly of claim 4, wherein the second PCB has
- a first PCB side directed towards the reflector and having a metallic layer thereon, and
- a second PCB side directed away from the reflector and comprising the one or more second electric lines.

6. The reflector sub-assembly of claim 4, wherein the metallic layer of the first PCB side of the second PCB is capacitively coupled to the reflector via a dielectric therebetween.

7. The reflector sub-assembly of claim 4, wherein the at least one first PCB and the second PCB are located on different sides of the reflector.

8. The reflector sub-assembly of claim 4, wherein the at least one first PCB and the second PCB are located on the same side of the reflector.

9. The reflector sub-assembly of claim 1, comprising: at least one mounting element for the one or more second radiators, wherein the mounting element extends, in a planar projection, from within the array of first radiators to outside the array of first radiators.

10. The reflector sub-assembly of claim 3, wherein multiple second radiators are provided; and wherein the mounting elements comprise a dedicated mounting element for each of the multiple second radiators.

11. The reflector sub-assembly of claim 1, wherein the array of first radiators comprises at least one of one or more rows and one or more columns.

12. The reflector sub-assembly of claim 11, wherein the at least one mounting element, in a planar projection, extends between two adjacent rows or two adjacent columns.

13. The reflector sub-assembly of claim 1, wherein the metallic layer of the first PCB side of the at least one first PCB is capacitively coupled to the reflector via a dielectric therebetween.

14. The reflector sub-assembly of claim 1, wherein the reflector defines multiple reflector openings.

15. The reflector sub-assembly of claim 14, wherein the reflector defines a dedicated reflector opening for a dedicated one of the first radiators.

16. The reflector sub-assembly of claim 14, wherein the at least one first PCB covers at least two of the multiple reflector openings.

17. The reflector sub-assembly of claim 16, wherein the at least one first PCB consists of a single PCB that covers each dedicated reflector opening.

18. The reflector sub-assembly of claim 1, wherein a circumferential shape of the reflector opening corresponds to, and is slightly larger than, a circumferential shape of one of the first radiators in the vicinity of its feeding end so that this feeding end can snugly be moved through the dedicated reflector opening upon manufacturing of the sub-assembly.

19. The reflector sub-assembly of claim 1, wherein the reflector comprises a substantially planar reflector surface in which the at least one reflector opening is defined.

20. The reflector sub-assembly of claim 1, wherein the reflector is made from sheet metal.

21. An antenna assembly comprising:

a reflector sub-assembly for the antenna assembly configured to support Frequency Division Duplex, FDD, and Time Division Duplex, TDD, modes of operation, the reflector sub-assembly comprising:

a reflector defining at least one reflector opening;

at least one first printed circuit board, PCB, arranged to cover the at least one reflector opening so as to prevent electromagnetic radiation from passing through the at least one reflector opening, the first PCB having:

a first PCB side directed towards the reflector and having a metallic layer thereon, and a second PCB side directed away from the reflector and comprising one or more first electric lines;

an array of first radiators to support a TDD mode, the first radiators extending through the at least one reflector opening in the reflector and having:

a feeding end directed towards the at least one first PCB and electrically connected to at least one of the one or more first electric lines; and a distant end facing away from the at least one first PCB and carrying at least one first radiating element; and one or more second radiators to support an FDD mode, the one or more second radiators having:

a feeding end positioned, in a planar projection, within the array of first radiators; and a distant end facing away from the reflector and carrying at least one second radiating element; and a housing sub-assembly coupled to the reflector sub-assembly to define an enclosed space accommodating at least the at least one first PCB.

22. The antenna assembly of claim 21, wherein the housing sub-assembly is configured to prevent electromagnetic radiation from leaving or entering the enclosed space in any region not shielded by the reflector sub-assembly.

23. The antenna assembly of claim 21, comprising:

active electronic components electrically connected to the at least one first PCB; and wherein the housing sub-assembly comprises a cooling housing thermally coupled to the active electronic components and having one or more geometric cooling structures in a region outside the enclosed space.

24. The antenna assembly of claim 23, comprising:

a shielding frame arranged between the reflector and the cooling housing.

25. The antenna assembly of claim 24, wherein the shielding frame is made from sheet metal.

26. The antenna assembly of claim 24, wherein the shielding frame is capacitively coupled to at least one of the cooling housing and the reflector via a dielectric therebetween.

27. The antenna assembly of claim 24, wherein the shielding frame is coupled to the reflector or the cooling housing without a metallic connection element being arranged therebetween.

28. A base station for a mobile network system, the base station comprising an antenna assembly comprising:

a reflector sub-assembly for the antenna assembly configured to support Frequency Division Duplex, FDD, and Time Division Duplex, TDD, modes of operation, the reflector sub-assembly comprising:

a reflector defining at least one reflector opening;

at least one first printed circuit board, PCB, arranged to cover the at least one reflector opening so as to prevent electromagnetic radiation from passing through the at least one reflector opening, the first PCB having:

a first PCB side directed towards the reflector and having a metallic layer thereon, and a second PCB side directed away from the reflector and comprising one or more first electric lines;

an array of first radiators to support a TDD mode, the first radiators extending through the at least one reflector opening in the reflector and having:

a feeding end directed towards the at least one first PCB and electrically connected to at least one of the one or more first electric lines; and a distant end facing away from the at least one first PCB and carrying at least one first radiating element; and one or more second radiators to support an FDD mode, the one or more second radiators having:

a feeding end positioned, in a planar projection, within the array of first radiators; and a distant end facing away from the reflector and carrying at least one second radiating element; and a housing sub-assembly coupled to the reflector sub-assembly to define an enclosed space accommodating at least the at least one first PCB.

* * * * *